Figure 1:
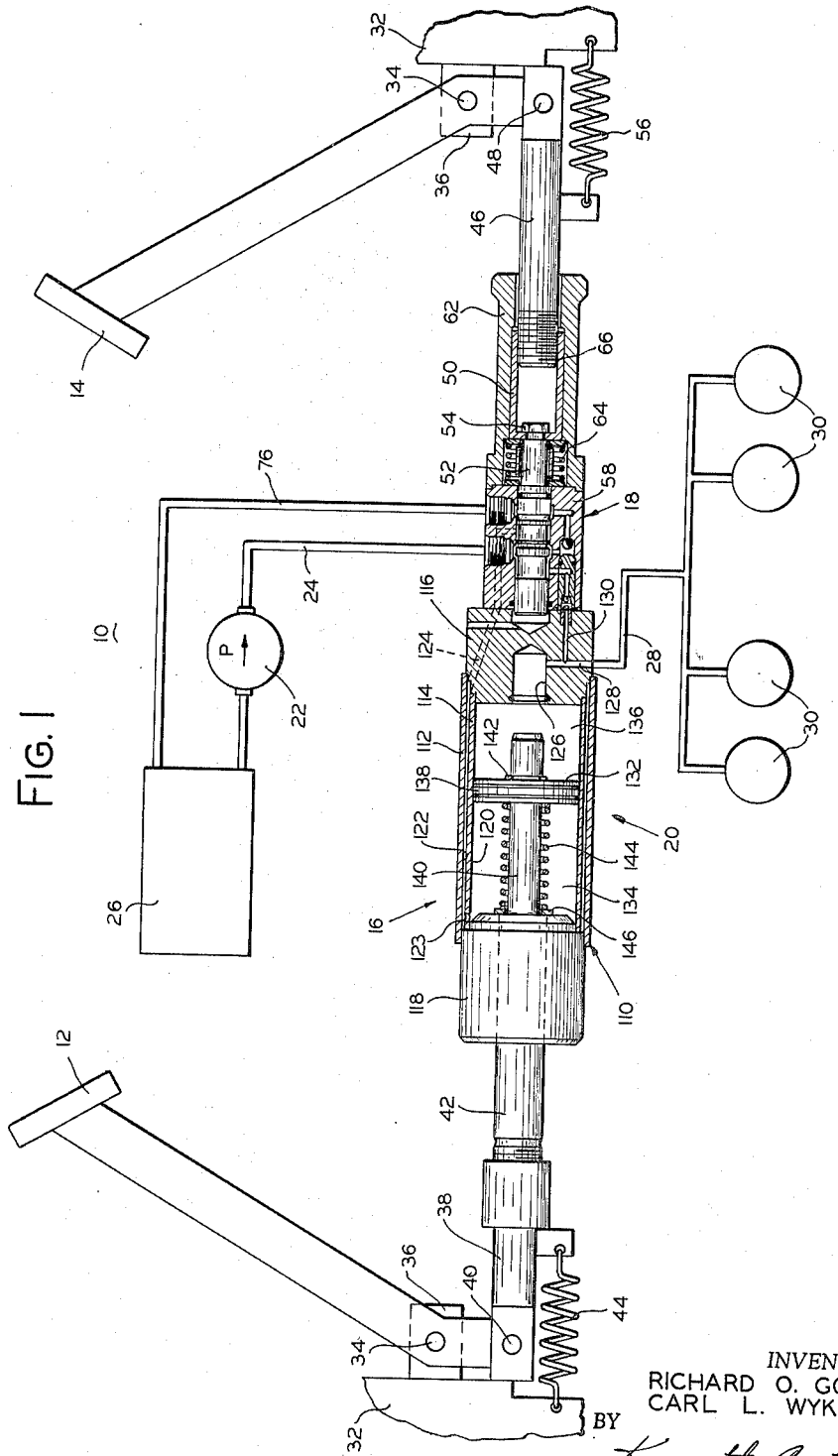

INVENTORS
RICHARD O. GORDON
CARL L. WYKOFF
BY Kenneth C. Witt
ATTORNEY

March 15, 1966 R. O. GORDON ETAL 3,240,019
POWER BRAKING SYSTEM
Filed Dec. 31, 1962 3 Sheets-Sheet 3

INVENTORS
RICHARD O. GORDON
CARL L. WYKOFF
BY
Kenneth C. Witt
ATTORNEY 3,240,019
POWER BRAKING SYSTEM
Richard O. Gordon, New Buffalo, Mich., and Carl L. Wykoff, New Carlisle, Ind., assignors to Clark Equipment Company, a corporation of Michigan
Filed Dec. 31, 1962, Ser. No. 248,784
3 Claims. (Cl. 60—54.5)

This invention relates to power braking systems, and more particularly to a system that can be operated from either of two stations having provision for emergency brake application in case the fluid pressure for power operation should fail.

While the invention is disclosed herein in an embodiment which provides for two brake operating stations, it will be understood that the invention is not so limited and can be applied with equal facility to a braking system having only a single brake pedal.

The object of our invention is to provide an improved power braking system of the character described having a simple, reliable and effective emergency braking arrangement.

In carrying out our invention in a preferred embodiment thereof, we provide a first chamber and an auxiliary chamber which is connected to one or more wheel brake actuators, and also opens into the first chamber. Piston means are disposed in the first chamber for forcing fluid out of the first chamber, through the auxiliary chamber and into the wheel brake actuators. The piston means includes a portion for sealing the auxiliary chamber from the first chamber and forcing fluid out of the auxiliary chamber to apply the wheel brake actuators under certain operating conditions.

Figure 2:
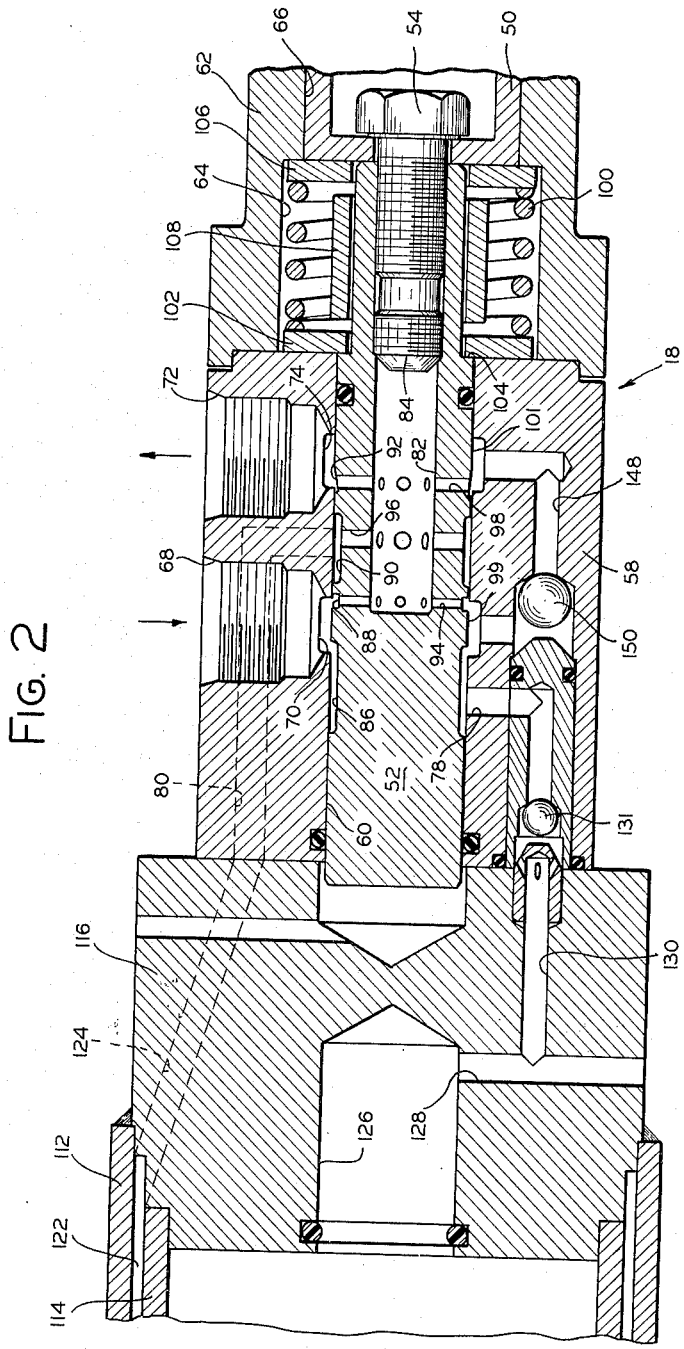
Figure 3:
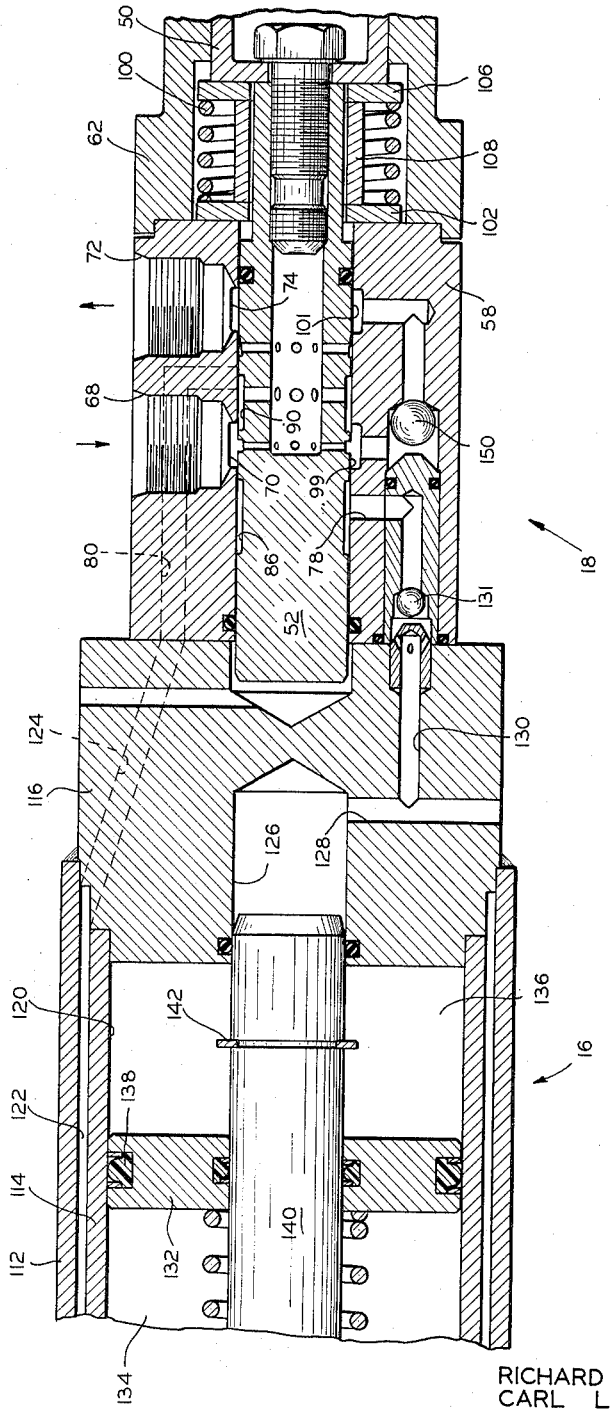

The above and other objects, features and advantages of our invention will become more readily apparent to persons skilled in the art when the following detailed description is taken in conjunction with the drawing wherein:

FIGURE 1 is a somewhat schematic diagram of a power braking system embodying our invention, FIGURE 2 is a fragmentary view on an enlarged scale of the control valve shown in FIG. 1, and FIGURE 3 is similar to FIG. 2 with the valve spool in a fully shifted position and the end of the piston rod telescoped within the auxiliary chamber.

Referring now to the drawing, the numeral 10 denotes generally a power braking system suitable for use with a vehicle. The power braking system 10 includes a pair of brake pedals 12 and 14, a fluid motor or fluid pressure transfer device 16 and a control valve 18, the fluid motor 16 and control valve 18 being joined to form a unitary assembly 20 which is connected between pedals 12 and 14. Also included in power braking system 10 is a pump 22 disposed in a fluid conduit 24 for supplying pressurized fluid to control valve 18 from a sump or reservoir 26 and a fluid conduit 28 for connecting fluid motor 16 to a plurality of wheel brake actuators 30. The pump 22 is a pressure-loaded gear pump, vane pump or other similar pump which permits fluid flow through it when it is in an inoperative condition. The reason for having such a pump will be explained hereinafter.

The brake pedals 12 and 14 are disposed in spaced-apart relation to each other and are pivotally connected in facing relation to a portion of an associated vehicle, preferably a portion of the vehicle frame 32, by means of pin and bracket connections 34, 36.

A link 38 is pivotally connected adjacent one end thereof to the bottom end of brake pedal 12 by a pin 40 and secured at the other end thereof to the piston rod 42 of fluid motor 16. It will be noted that longitudinal movement to the left of link 38 is limited by abutment with frame portion 32, and that link 38 is normally biased into abutment with frame portion 32 by a tension spring 44 connected between link 38 and frame portion 32. Also, a link 46 is pivotally connected adjacent one end to the bottom end of brake pedal 14 by a pin 48 and is secured at the other end to a sleeve member 50 which in turn is secured to the spool 52 of control valve 18 by means of a machine screw 54. Again, it is to be noted that longitudinal movement of link 46 to the right is limited by abutment with frame portion 32 and that link 46 is normally biased into abutment therewith by a tension spring 56 connected between link 46 and frame portion 32. At this point it will be appreciated that fluid motor and control valve assembly 20 is disposed between and supported by brake pedals 12 and 14 through the connection of link 38 to piston rod 42 and the connection of link 46 to sleeve member 50. Further, it will be observed that when one pedal is being used to actuate the power brake system that the other pedal serves merely as a pivotal connection. Thus, if only one station operation of the power brake system is required, then the unnecessary brake pedal may be replaced by a simple pivotal connection without any change in the operation of the power brake system, except that it can be operated from only one operator station.

As may be seen best in FIGS. 2 and 3, the control valve 18 includes an elongated body portion 58 having a longitudinally extending bore 60 within which spool 52 is slidably disposed, and a cylindrical member 62 which is connected to the right end of valve body 58 and has a bore portion 66 and a counterbore portion 64. Valve body 58 includes an inlet port 68 which communicates with an annular groove 70 in the wall of bore 60 and an outlet port 72 which communicates with an annular groove 74 in the wall of bore 60. The inlet port 68 is connected to fluid conduit 24 (FIG. 1) and hence to pump 22 while the outlet port 72 is connected to a fluid conduit 76 (FIG. 1) which communicates with reservoir 26. Also disposed in valve body 58 is a fluid passage 78 which communicates at one end thereof with bore 60 at a point intermediate annular groove 70 and the left end of the valve body and communicates at the other end thereof with a check valve 131 which in turn communicates with fluid motor 16 as will be explained in more detail hereinafter. Another fluid passage 80 similar to passage 78 is likewise disposed in valve body 58 and communicates at one end thereof with bore 60 at a point intermediate annular grooves 70 and 74 and communicates at the other end thereof with fluid motor 16 as will be explained in more detail shortly.

The spool 52 has a bore 82 which extends from the right end thereof longitudinally of the spool for about half of its length. The open end of bore 82 is closed by a plug 84. Disposed in the outer periphery of spool 52 is an annular groove 86 which connects fluid passage 78 with annular groove 70 and hence inlet port 68 when spool 52 is centered in the valve body 58, as shown in the drawing. Also disposed in the outer periphery of spool 52 are annular grooves 88, 90 and 92 which communicate respectively with groove 70, fluid passage 80 and groove 74 in the centered position of the spool. The groove 88 is connected to bore 82 by means of a plurality of radially extending fluid passages 94. Similarly, grooves 90 and 92 are connected to bore 82 by a plurality of fluid passages 96 and 98, respectively. Thus, it will be seen that when spool 52 is centered, inlet port 68 is in communication with fluid conduit 78 by way of annular groove 86 and in communication with fluid conduit 80 by the connection of groove 88 with groove 90 through passages 94, 82 and 96 in spool 52. Also, substantially free flow of fluid from inlet port 68 to outlet port 72 is provided by the connection of groove 88 with groove 92 through passages 94, 82 and 98 in spool 52. At this point it should be apparent that when spool 52 is in the extreme leftward position relative to valve body 58 (FIG. 3) that communication between fluid passage 78 and inlet port 68 will be closed off by a land portion 99. Also, communication between inlet port 68 and outlet port 72 will be closed by a land portion 101 with the result that the entire supply of pressure fluid from the inlet port 68 will be directed solely to fluid passage 80.

The spool 52 is maintained in a centered position relative to valve body 58 by means of a centering spring 100 which is disposed between a washer 102 that abuts a shoulder 104 on spool 52 and another washer 106 which abuts sleeve 50 so that movement of spool 52 to the left or right relative to valve body 58 tends to compress spring 100. The movement of spool 52 relative to valve body 58 is limited by a sleeve 108 disposed between washers 102 and 106. The spool 52 can be moved relative to the valve body 58 only the distance of the clearance between the sleeve 108 and the washers 102 and 106 at which point the spool 52 is locked to the valve body 58.

The fluid motor or fluid pressure transfer device 16 includes a cylinder portion 110 having a pair of telescoped cylindrical wall members 112 and 114 which are closed at one end by a closure member 116 and at the other end by a closure member 118, thereby defining a closed bore 120. Also, the wall members 112 and 114 define an annular passage 122 therebetween which communicates with bore 120 adjacent closure member 118 through a port 123. The other end of annular passage 122 communicates with a fluid passage 124 in closure member 116 which in turn is in register with fluid passage 80 in valve body 58. The closure member 116 also includes a bore or auxiliary chamber 126 which is of smaller diameter than bore 120 and opens into it. The bore 126 is connected to conduit 28 by means of fluid passage 128 disposed in closure member 116, and also is connected with fluid passage 78 by means of a fluid passage 130 which, as shown, intersects with passage 128, and a one-way check valve 131 which is disposed between passages 78 and 130 so that fluid flow is permitted only from passage 78 to passage 130 and hence to bore 126 and wheel brake cylinders 30. It will now be seen that bore 120 is connected adjacent the rod (or left) end thereof to bore 60 of control valve 18 by port 123, annular fluid passage 122 and fluid passages 124 and 80. Also, the head end of bore 120 is connected to bore 60 by means of bore 126, fluid passages 128 and 130, check valve 131 and fluid passage 78; and connected to the wheel brake cylinders 30 by bore 126, fluid passage 128 and conduit 28.

Slidably disposed in closed bore 120 is a piston 132 which separates it into a first chamber 134 and a second chamber 136. The piston 132 is provided with a sealing element 138 in the outer periphery thereof to prevent fluid leakage between chambers 134 and 136.

Piston rod 42 extends slidably through closure member 118 of the motor and has a reduced diameter portion 140 which extends into the enclosed portion of the motor and slidably passes through piston 132. The piston 132 is retained on rod portion 140 by means of a snap ring 142 which engages an annular groove in rod portion 140. Piston 132 normally is maintained in abutment with snap ring 142 by means of a compression spring 144 disposed between piston 132 and a washer member 146 which abuts the shoulder on piston rod 42 formed by the reduced diameter portion 140. This mounting of piston 132 permits movement of rod portion 140 to the right even though fluid cannot escape from chamber 136. It is to be noted that piston rod 42 is aligned coaxially with bore 126, and also that the rod portion 140, upon sufficient rightward movement thereof, which occurs only when there is a pressure fluid failure, telescopes within bore 126 and functions as a piston therein.

It is to be noted that if, following a power brake application, the piston 132 does not return to its neutral position in cylinder 110, as shown in FIG. 1, then springs 44 and 54 are strong enough to overcome centering spring 100 with the result that spool 52 is displaced to the right relative to body 58. Consequently, inlet port 68 will be placed in communication with chamber 136 via passages 78, 130 and 128 and communication between inlet port 68 and outlet port 72 will be closed off, and so pressurized fluid will be supplied to chamber 136, thereby forcing piston 132 to return to its neutral position.

Although not specifically described, conventional fluid sealing means are provided throughout our invention where necessary to prevent undesirable leakage of fluid between adjacent surfaces.

Turning now to a description of the operation of our invention, it will be assumed that our invention is embodied in a vehicle having a dual position operator's station so that the operator may always face in the direction of vehicle travel. Assume also that neither brake pedal 12 nor 14 is actuated, and that pump 22 is supplying pressurized fluid to inlet port 68 through conduit 24. Since neither of the brake pedals is actuated the spool 52 is in the centered position, best seen in FIG. 2, in which position pressurized fluid entering control valve 18 through inlet port 68 flows to outlet port 72 via groove 88, passages 94, bore 82, passages 98 and groove 92. Also, pressurized fluid in inlet port 68 is in communication with fluid passage 78 via annular groove 86, and since passage 78 is connected to fluid passage 28 by way of passages 128 and 130 the brake system is maintained full of fluid. Because the flow of fluid from the inlet port 68 to the outlet port 72 is substantially unrestricted the pressure of the fluid in the wheel brake cylinders 30 is of a small magnitude and will not apply the brakes of the vehicle since the force exerted thereby would not be sufficient to overcome the release springs in the brakes.

Now, when the operator desires to brake the vehicle, assuming that he is facing to the right, as seen in FIG. 1, so that he will manipulate brake pedal 14, he depresses brake pedal 14 which moves spool 52 to the left relative to valve body 58 sufficiently to block communication between fluid passage 78 and inlet port 68. At the same time communication between fluid passages 98 and outlet port 72 is blocked with the result that the entire fluid flow from inlet port 68 is directed through fluid passage 80 into chamber 134 of fluid motor 16 thereby causing cylinder 110 to move to the left relative to piston 132. Movement of cylinder 110 to the left forces the fluid in chamber 136 through the connecting passages into wheel brake cylinders 30 thereby applying the vehicle brakes. When the operator releases pressure upon brake pedal 14 the centering spring 100 returns the spool 52 to the centered position relative to the valve body 58 so that wheel brake cylinders 30 are placed in communication with reservoir 26 through connecting fluid passages, thereby releasing the vehicle brakes.

If the operator is facing in the other direction so that he would depress brake pedal 12 in order to apply the vehicle brakes, such actuation of pedal 12 will move valve body 58 relative to spool 52 because the fluid in chamber 136 tends to cause motor cylinder portion 110 to move along with piston rod 42 so that in effect spool 52 is displaced to the left relative to valve body 58, as described above for actuation of brake pedal 14. Consequently, pressurized fluid is supplied to chamber 134 the same as when pedal 14 is actuated, but in this case causes piston 132 to move to the right relative to cylinder 110 since an additional rightward force is exerted on piston 132 through brake pedal 12. Otherwise, the operation of power braking system 10 is the same regardless of which brake pedal is depressed.

In the event that pressure fluid is no longer supplied to inlet port 68 due to a failure of pump 22, for example, it is still possible to generate sufficient fluid pressure to brake the vehicle by depressing either brake pedal 12 or 14 to actuate wheel brake cylinders 30 and apply the vehicle brakes. Assuming that pump 22 has failed and it is desired to apply the vehicle brakes, the brake pedal 14 may be depressed and, as described previously, communication between fluid passage 78 and inlet port 68 is blocked, as is communication between fluid passages 98 and outlet port 72. Further depression of brake pedal 14 causes spool 52 to move further to the left, as best seen in FIG. 3, until it is locked to valve body 58 through abutment of washers 102 and 106 with sleeve 108. Further actuation of brake pedal 14 from this point causes cylinder 110 to move to the left while piston 132 and piston rod 42 are maintained stationary due to abutment of link 38 with frame portion 32 so that fluid in chamber 136 is forced into brake wheel cylinders 30 through the connecting passages until the brake shoes are in abutment with the respective brake drums, assuming shoe brakes are utilized. At the same time the volume of chamber 134 will be increasing. In order to avoid drawing a vacuum in chamber 134 groove 70 is connected to outlet port 72 by fluid passage means 148 within which is disposed a one-way check valve 150 which permits fluid flow only from outlet port 72 to groove 70. Thus, fluid will be drawn from reservoir 26 into chamber 134 as the volume thereof increases. At this point the slack in the brake wheel cylinders 30 has been taken up due to the initial movement of piston 132 forcing fluid out of chamber 136 and the vehicle brakes may be partially applied, or are ready for application. Also, the end of the rod portion 140 has not yet begun to telescope into bore 126, so that further rightward movement of rod portion 140 until it telescopes within bore 126 and seals the fluid trapped therein causes fluid to be displaced from chamber 136 which results in piston 132 moving slightly to the left against the bias of spring 144. So far the actuation of brake pedal 14 has resulted in taking up the slack in the braking system, and perhaps, provided a light braking application, but now that rod portion 140 has enter bore 126 the area against which the pressure of the fluid trapped in bore 126 will act to resist depression of pedal 14 is greatly reduced with the result that the mechanical advantage between the brake pedal and the brake wheel cylinders is substantially increased. Consequently, the operator through slight additional pressure on brake pedal 14 can greatly increase the pressure of fluid in bore 126 in order to effectively apply the vehicle brakes. It will be noted that when the piston is moved slightly to the left to allow for displacement of fluid in chamber 136 caused by the further movement of the end of rod portion 140 that fluid also must be displaced out of chamber 134 on the other side of the piston. This fluid is displaced back to reservoir 26 through conduit 24 because spool 52 is in the extreme leftward position so that conduit 80 is connected to inlet port 68. Because fluid must be displaced through conduit 24 to reservoir 26 the pump 22 must be, as explained earlier, a type which permits fluid flow therethrough when the pump is in an inoperative condition. Alternatively, a valve which bypasses pump 22 when it is inoperative may be placed in the circuit. In this case a gear pump or the like could be used.

For the reasons pointed out hereinabove, actuation of brake pedal 12 under the same circumstances will operate power braking system 10 in a similar manner, except that valve body 58 is moved relative to spool 52 and initially communication of bore 126 with inlet port 68 is blocked by one-way check valve 131 rather than land 99 as is the case when the spool 52 is moved relative to valve body 58.

The above description of the power braking system and the operation thereof is intended to be exemplary only, and the limits of our invention should be determined from the following appended claims taken in conjunction with the relevant prior art.

We claim:
1. A power braking apparatus adapted for supplying pressurized fluid to the wheel brake actuators of a vehicle, comprising an operator's brake applying member and an elongated unitary control valve and fluid pressure transfer device adapted to be anchored at one end to a vehicle and at the other end operatively connected to the said brake applying member, the said device having a control valve portion comprising an outer body member and an inner spool member and a fluid pressure transfer portion comprising a cylinder portion connected to the said valve body portion and a piston movable rectilinearly in the said cylinder portion, the said cylinder portion having closure members at either end thereof forming respectively with the said piston a pair of internal chambers, a piston rod carrying the said piston and having a projecting end thereon, one of the said closure members having a bore therein forming an auxiliary chamber communicating normally with one of the said first-mentioned pair of chambers, fluid connections to the said valve from a source of pressurized fluid, means for maintaining the said one chamber and the said auxiliary chamber full of fluid during non-brake-applying conditions, conduit means for transmitting pressurized fluid from the said valve to the other of the said pair of chambers upon actuation of the brake applying member thereby simultaneouly moving the said piston in the said cylinder and the said piston rod toward the said auxiliary chamber, additional conduit means adaptable for connecting the said auxiliary chamber to the wheel brake actuators, the said movement of the piston discharging fluid from the said one chamber through the said auxiliary chamber and the said additional conduit means to the wheel brake actuators, the said device being so arranged that a predetermined movement of the brake applying member causes the said piston rod to trap fluid in the said auxiliary chamber and then further movement of the said brake applying member causes the said piston rod to move further into the said auxiliary chamber and transmit pressurized fluid from the said auxiliary chamber through the said additional conduit means to the wheel brake actuators.

2. A power braking apparatus operable to supply pressurized fluid to the wheel brake actuators of a vehicle comprising an operator's brake applying member and an elongated unitary control valve and fluid pressure transfer device adapted to be anchored at one end to the vehicle and at the other end operably connected to the said brake applying member, the said device including a control valve portion having a body member, a spool member disposed for movement in the said body member and means for locking said body and spool members together following a predetermined relative movement between said body and spool members and a fluid pressure transfer portion including a cylinder connected to the said valve body and a piston movable rectilinearly in the said cylinder, the said cylinder having closure members at either end thereof forming respectively with the said piston a pair of chambers, a piston rod slidably carrying the said piston and having a projecting end thereon, one of the said closure members having an auxiliary chamber communicating normally with one of the said first-mentioned pair of chambers, fluid connections to the said valve from a source of pressurized fluid, means for maintaining the said one chamber and the said auxiliary chamber full of fluid during non-brake applying conditions, conduit means for transmitting pressurized fluid from the said valve to the other of the said pair of chambers upon actuation of the brake applying member thereby simultaneously moving the said piston and piston rod toward the said auxiliary chamber, additional conduit means for connecting the said auxiliary chamber to the wheel brake actuators, the movement of the said piston discharging fluid from the said one chamber through the said auxiliary chamber and the said additional conduit means to the wheel brake actuators, sufficient actuation of the brake applying member in the event that pressurized fluid is not supplied to the said other chamber causing the said piston rod to trap fluid in the said auxiliary chamber.

3. In a power braking system operable to supply pressurized fluid to the wheel brake actuators of a vehicle, an elongated unitary control valve and fluid pressure transfer device comprising a control valve portion having a body member and a spool member disposed therein and a fluid pressure transfer portion having a cylinder member connected to the said body member and a piston movable in the said cylinder, the said cylinder having closure members at either end thereof forming respectively with the said piston a pair of chambers, a piston rod carrying the said piston and having a projecting end thereon, one of the said closure members having an auxiliary chamber therein communicating normally with one of the said first-mentioned pair of chambers, fluid connections to the said valve from a source of pressurized fluid, means for maintaining the said one chamber and the said auxiliary chamber full of fluid during non-braking conditions, means for transmitting pressurized fluid from the said valve to the other of the said pair of chambers upon actuation of the said valve thereby simultaneously moving the said piston and piston rod toward the said auxiliary chamber, additional conduit means for connecting the said auxiliary chamber to the wheel brake actuators, the said movement of the piston and piston rod displacing fluid from the said one chamber through the said auxiliary chamber and the said additional conduit means to the wheel brake actuators, means for locking the said valve body and valve spool together following a predetermined relative movement between the said valve body and valve spool, a predetermined relative movement between the said piston rod and cylinder causing the said piston rod to trap fluid in the said auxiliary chamber.

References Cited by the Examiner
UNITED STATES PATENTS

| | | | |
|---|---|---|---|
| 763,833 | 6/1904 | Albree | 60—54.6 X |
| 1,537,316 | 5/1925 | Lansing | 60—54.6 X |
| 1,958,722 | 5/1934 | Sinclair et al. | 60—54.6 |
| 2,311,787 | 2/1943 | Swift | 60—54.6 |
| 2,354,957 | 8/1944 | Loweke | 60—54.6 |
| 2,406,304 | 8/1946 | Levy | 60—52 |
| 2,438,649 | 3/1948 | Roy | 60—54.6 |
| 2,451,010 | 10/1948 | Yanchenko | 91—424 |
| 2,503,892 | 4/1950 | Vickers | 60—54.5 |
| 2,508,403 | 5/1950 | Knauss | 60—54.6 |
| 2,561,009 | 7/1951 | Byers et al. | 60—54.6 |
| 2,598,907 | 6/1952 | Griffin | 91—424 |
| 2,702,455 | 2/1955 | Erle | 60—54.6 |
| 2,820,346 | 1/1958 | Cook | 60—54.6 |
| 2,838,911 | 6/1958 | Vick | 60—54.6 |

SAMUEL LEVINE, *Primary Examiner.*
ROBERT R. BUNEVICH, *Examiner.*